United States Patent [19]

Marawi

[11] Patent Number: 5,122,945
[45] Date of Patent: Jun. 16, 1992

[54] VOLTAGE CONTROLLED PRELOAD

[75] Inventor: Bassam S. Marawi, Amherst, Ohio

[73] Assignee: Reliance Comm/Tec Corporation, Lorain, Ohio

[21] Appl. No.: 693,561

[22] Filed: Apr. 30, 1991

[51] Int. Cl.⁵ .................................. H02M 3/335
[52] U.S. Cl. ................................ 363/21; 363/56; 363/97
[58] Field of Search ............. 363/18, 19, 20, 21, 363/56, 89, 97; 323/267

[56] References Cited

U.S. PATENT DOCUMENTS

| | | | |
|---|---|---|---|
| 4,468,722 | 8/1984 | Kamiller | 363/21 |
| 4,517,633 | 5/1985 | Melcher | 363/21 |
| 4,521,842 | 6/1985 | Kammiller | 363/21 |
| 4,831,507 | 5/1989 | Colley, III et al. | 363/97 |
| 4,833,582 | 5/1989 | Kupka | 363/21 |
| 4,945,465 | 7/1990 | Marinus et al. | 363/89 |

Primary Examiner—Peter S. Wong
Attorney, Agent, or Firm—Fay, Sharpe, Beall, Fagan, Minnich & McKee

[57] ABSTRACT

A preload circuit for a DC to DC converter which has main and auxiliary outputs. The circuit responds to the voltage in the auxiliary output circuit to provide a linearly varying preload at the converter's main output terminals. The preload is a maximum when the usual load at the main output terminals is at the no load condition and becomes zero when the usual load at the main output terminals reaches a predetermined load condition which depends on the amplitude of the auxiliary output voltage and the amplitude selected for a reference voltage. In response to the linearly varying preload the converter linearly increases the duty cycle of its switching device(s). That linear increase in duty cycle causes the voltage in the auxiliary output circuit to linearly increase to thereby linearly maintain the auxiliary output voltage in regulation over the usual load condition at the main output terminals for which the preload is active and for the entire auxiliary output load range.

18 Claims, 5 Drawing Sheets

VOLTAGE CONTROLLED PRELOAD

BACKGROUND OF THE INVENTION

This invention relates to multiple output DC to DC converters. It finds particular application in conjunction with a voltage controlled preload for the main output of the converter to maintain regulation on the other outputs of the converter and will be described with particular reference thereto. It is to be appreciated, however, the invention has broader applications and maybe advantageously employed in other environments and applications.

DC to DC converters provide a regulated DC output voltage from an unregulated DC input voltage. Many such converters provide both main output and auxiliary output voltages. The operation of the converter switching means is controlled to maintain a regulated voltage at the main output of the converter. The auxiliary output voltages are regulated by the turns ratio of the transformer which couples the auxiliary output circuits to the power switching means. If needed the auxiliary output voltages are further regulated by a post regulator. The load at the main output and the loads on the auxiliary outputs are independent from each other.

The load connected to the main converter output may vary from very light i.e. no load, to very heavy i.e. full load. The loads on the auxiliary outputs also vary from no load to full load. The converter input voltage may also vary over a wide range e.g. three to one. The converter must provide regulated main and auxiliary output voltages for all load conditions, i.e. over the entire load range and over the entire range of input voltage variation. When the converter operates at the no load condition for the main output this requirement of maintaining regulated voltage at the auxiliary output over the entire auxiliary output load range necessitates the use of a preload for the main output. Such a preload can be provided by a resistor. The resistor will, however, degrade the efficiency of the converter by a noneligible amount when the converter operates at full load and does not provide for a linear adjustment of the preload over the entire range of operation. Therefore it is desirable that a preload be adjustable based on the voltage regulation of the auxiliary output. Such a preload will maximize converter efficiency.

SUMMARY OF THE INVENTION

In accordance with one aspect of the present invention, an apparatus for linearly preloading a main output of a DC to DC converter having a main and auxiliary output is provided. The apparatus provides varying linear preloading to the main output in a range from a no-load condition to a full-load condition. The apparatus includes a comparing device which is arranged with a first input for sensing an output value from the auxiliary output, a second input for sensing a preselected reference value, and an output for outputting a differential output based on the values sensed by the first input and second input. A preload device such as a transistor is connected across the main output, and to sense the differential output of the comparing device. In this manner, linear variations in the operation of the transistor due to the linearly varying output of the comparing device causes the transistor to appear across the main output as a linear varying preload.

In accordance with another aspect of the present invention, the DC to DC converter includes a switching device for switching the DC input to primary windings of the converter. The switching device is controlled by a controller which sets the rate at which the switching device operates. A feedback circuit associated with an output terminal of the main output device and the controller provides a feedback signal to the controller. This signal adjusts the rate of switching by the switching device in order to produce a duty cycle which compensates for the appearance of the linear varying preload at the main output terminals.

In accordance with another aspect of the present invention, the apparatus is designed to operate with a DC to DC converter whose main output is negative and whose auxiliary output is positive.

In accordance with another aspect of the present invention the apparatus is arranged to function with a DC to DC converter whose main output and auxiliary output are both positive.

In accordance with yet another aspect of the present invention, the present apparatus is arranged to function with a DC to DC converter whose main output is positive and auxiliary is negative.

In still another aspect of the present invention, the apparatus is arranged to function in a DC to DC converter whose main and auxiliary outputs have different grounds.

One advantage of the present invention is that it provides a preload with a smooth linear transition from a full-load to no-load range on the main winding output.

Another advantage of the present invention resides in the elimination of a ripple effect at the output which would otherwise occur due to switching the preload into and out of the converter.

Still another advantage of the present invention resides in the elimination of an indecision time or range wherein whether insertion of the preload is required is ambiguous.

Still yet another advantage of the present invention is of a more energy efficient system which lowers the wattage dissipation as opposed to a set preload value.

Still further advantages of the present invention will become apparent to those of ordinary skill in the art upon reading and understanding the following detailed description of the preferred embodiment.

DETAILED DESCRIPTION OF THE PREFERRED EMBODIMENTS

Figure 1:
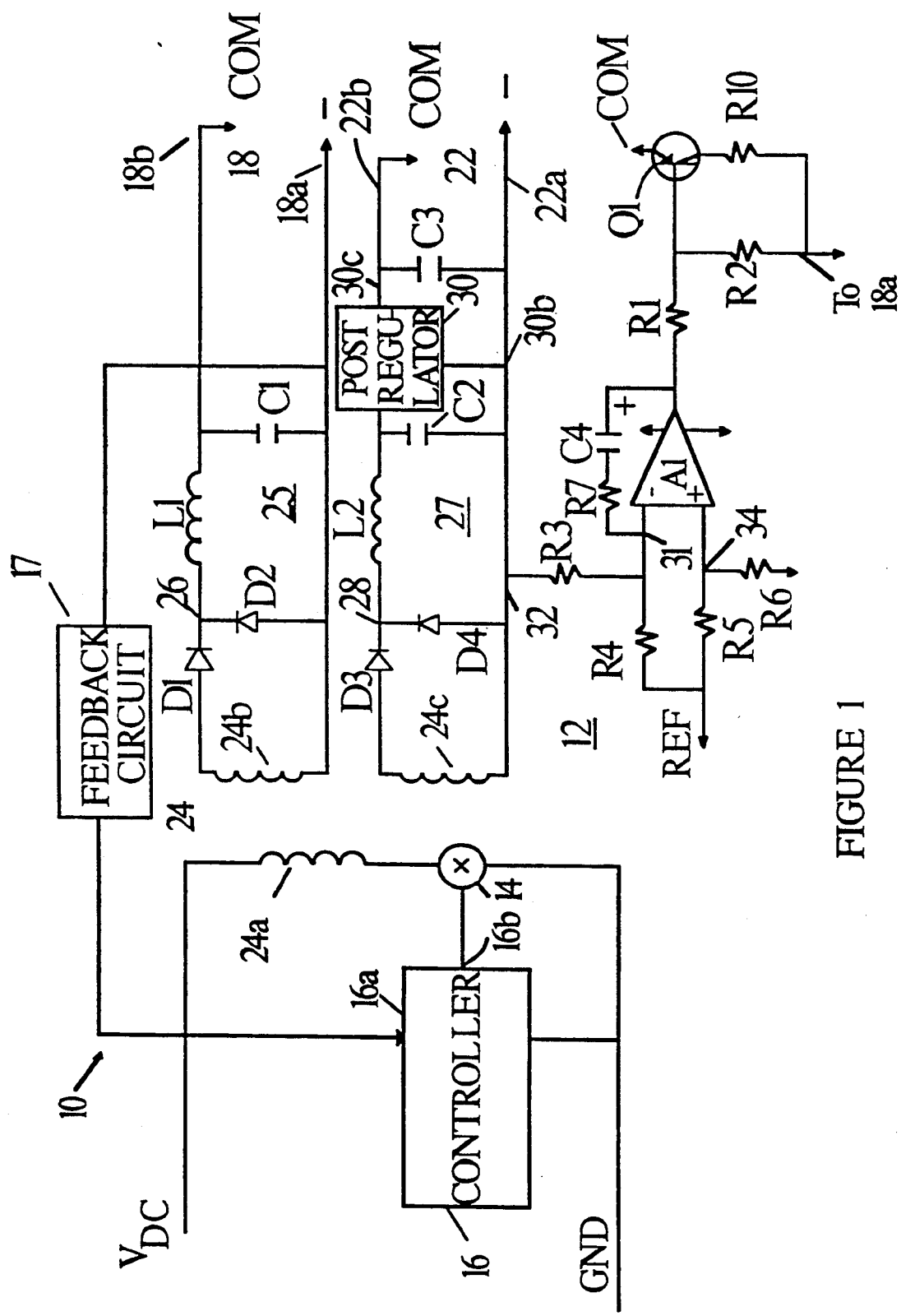
FIG. 1 is a simplified schematic diagram showing a DC to DC converter including the preload circuit of the present invention.

Referring now to the drawings wherein the showings are for purposes of illustrating the preferred embodiments of the invention only and not for purposes of limiting same. FIG. 1 shows a simplified schematic diagram for a converter 10 which includes the voltage controlled preload circuit 12 of the present invention. Converter 10 includes a switching device 14 whose conduction time is controlled by controller 16 so that a regulated DC voltage is provided at the main output 18 of the converter from a DC voltage at the converter input 20. Converter 10 also provides a regulated DC voltage at the auxiliary output 22 of the converter.

Converter 10 also includes a power transformer 24 having a primary winding 24a connected in series between input 20 and switching device 14. The power transformer has two secondary windings 24b and 24c. Secondary winding 24b is part of a main output circuit 25 which is associated with the main output 18, while secondary winding 24c is part of an auxiliary output circuit 27 which is associated with the auxiliary output 22.

In main output circuit 25, one end of winding 24b is connected by a diode D1 to a junction 26. The other end of winding 24b is connected to main output terminal 18a. A diode D2 is connected between junction 26 and terminal 18a. An output inductor L1 is connected in series between junction 26 and main output terminal 18b. An output capacitor C1 is connected in parallel across output terminals 18a and 18b. Terminal 18b is connected to circuit common (COM). Regulation of the main output voltage is obtained by providing through feedback circuit 17 a signal to input 16a of controller 16 representative of the main output voltage. Output 16b of controller 16 is connected to a switching device 14 to control its rate of switching, i.e. its duty cycle, to thereby regulate the main output voltage.

In auxiliary output circuit 27, one end of winding 24c is connected by diode D3 to a junction 28. The other end of winding 24c is connected to auxiliary output 35 terminal 22a. A diode D4 is connected between junction 28 and terminal 22a. An inductor L2 connects junction 28 to junction 29. A capacitor C2 connects junction 29 to output terminal 22a. A post regulator circuit 30 has its terminal 30a connected to junction 29, its terminal 30b connected to output terminal 22a and its terminal 30c connected to auxiliary output terminal 22b. Terminal 22b is connected to circuit common (COM). A capacitor C3 is connected in parallel across output terminals 22a and 22b. The post regulator circuit 30 provides the regulation for the auxiliary output voltage and may be embodied in any one of a number of forms well known to those skilled in the art, including a pulse width modulation type circuit.

Voltage controlled preload circuit 12 includes an operational amplifier A1 which has its inverting input connected to a junction 31. The junction 31 is connected by a resistor R3 to junction 32 of circuit 27. A resistor R4 connects junction 31 to a reference voltage (REF). The inverting input of A1 is connected by the series combination of resistor R7 and capacitor C4 to the output of amplifier A1. The noninverting input of amplifier A1 is connected to a junction 34 which is connected by a resistor R5 to REF and by a resistor R6 to circuit common (COM).

The output of amplifier A1 is connected by a resistor R1 to the base of p-n-p transistor Q1. The base of Q1 is also connected by a resistor R2 to terminal 18a of the regulated main output voltage of converter 10. The collector of Q1 is connected by a resistor R10 to the terminal 18a of the regulated main output voltage while the emitter of Q1 is connected to COM. Since the emitter of transistor Q1 is connected to COM and the collector and base of Q1 are both connected to the regulated main output voltage, the transistor appears across the main output terminals 18a, 18b of converter 10.

Operational amplifier A1 acts as a comparing device to compare the voltage at its inverting input, i.e. the unregulated auxiliary voltage of converter 10 to a preselected voltage reference REF. The output of A1 is varied linearly between a voltage Vcc and ground depending on the amplitude difference between the REF and the voltage at the inverting input. As the load on the main output terminals 18a, 18b approaches the no load condition, the output voltage of amplifier A1 approaches ground. The output voltage of amplifier A11 approaches Vcc as the load on the main output terminals increases from the no load condition. The main output load condition at which the output voltage of amplifier A1 becomes equal to Vcc depends on the auxiliary output voltage amplitude, the amplitude selected for the reference voltage and the resistance of resistors R5 and R6.

Resistors R1 and R2 function as a divider network to determine the voltage and current on the base of transistor Q1. Since R1 is connected to the output of A1, the linearly varying output voltage of the operational amplifier controls the conduction of Q1. The conduction of transistor Q1 approaches a maximum as the output voltage of amplifier A1 approaches ground.

Transistor Q1 is configured to operate over the linear portion of its volt-ampere characteristic curve. Since the transistor voltage is held fixed at the regulated main output voltage, the transistor current then varies linearly with transistor gain, i.e. as the output of A1 varies linearly. The transistor current approaches a maximum as the output voltage of amplifier A1 approaches ground. The transistor current approaches zero as the output voltage of amplifier A1 approaches Vcc.

As described above, transistor Q1 appears across the main output terminals 18a, 18b of converter 10. Therefore, the linear variation of the current of the transistor due to the linearly varying output voltage of A1 causes the transistor to appear across those output terminals as a linearly varying load, i.e. a voltage controlled preload. That preload varies linearly. It approaches a maximum when the usual load at the main output terminals approaches the no load condition and it approaches zero when the output voltage of amplifier A1 approaches Vcc. The output voltage of amplifier A1 approaches Vcc as the usual load at the main output terminals approaches a predetermined load condition. The predetermined load condition is a function of the amplitude selected for the auxiliary output voltage, the reference voltage and the resistances of resistors R5 and R6. Thus a voltage controlled preload which linearly varies from a maximum at the no load condition to zero when the output voltage of A1 rises to Vcc appears across the main output terminals.

The appearance of the linearly varying preload at the main output terminals causes the main output voltage of converter 10 to become unregulated. In response, feedback path 17 provides a signal to controller 16 which increases the duty cycle of switching device 14 as compared to what the duty cycle would be in the absence of the preload. The increase of the duty cycle brings the main output voltage back into regulation. The increase in the duty cycle approaches a maximum as the preload approaches a maximum. As the preload linearly varies from a maximum to zero the increase in duty cycle due to the preload also linearly varies from a maximum to zero.

That increase in the duty cycle due to the preload also causes the unregulated voltage in auxiliary output circuit 27 to increase as compared to what that voltage would be in the absence of the preload. The increase in the auxiliary circuit unregulated voltage also linearly varies from a maximum to zero as the duty cycle linearly varies from a maximum to zero. Therefore, the voltage controlled preload of the present invention maintains the auxiliary output of the converter in regulation as the usual load at the converter's main output terminals varies from the no load condition to a predetermined load condition by increasing the duty cycle of switching device 14 to the level that the auxiliary output voltage requires in order to stay in regulation.

The resistor R10 limits the linearly varying transistor current to a predetermined maximum amplitude. That resistor also shares the power dissipation with the transistor. In one embodiment of circuit 12 wherein it was desired to limit the current to a maximum amplitude of 0.5 amperes, resistor R10 was selected to have a resistance of 24 ohms. In that same embodiment the reference voltage REF was selected to be 2.5 volts and resistors R5 and R6 were each selected to have resistances of 10 Kohms.

It should be noted that in FIG. 1 the main converter output 18 and the auxiliary converter output 22 are both negative with respect to circuit common (ground), i.e. terminals 18a and 22a are negative with respect to terminals 18b and 22b. In addition both terminals 18b and 22b share the same ground.

With reference to the above discussed embodiment in order, for example, to keep the auxiliary output 22 at −5.3 V and at 6A in regulation when the main output 18 is at −12.7 V and at no load and for an input voltage variation from 19 to 60 VDC, it is necessary to add a preload of 0.5 A. Adding a simple resistor preload will degrade the converter efficiency at full load by approximately 6.5 watts. The present preload circuit 12 discloses a preload that is adjustable based on the voltage regulation of the auxiliary output to keep a minimum voltage in the front end of the post regulator 30 so as to keep the auxiliary output 22 in regulation. The circuit adjusts the preload to compensate for required load on the main output 18 up to 0.5 A and also adjusts the load down to zero amps or any value inbetween either because the load existing on the main output (−12.7 V) or the auxiliary output (−5.3 V) is not at its full load. Thus the converter's efficiency is maximized.

Figure 2A:
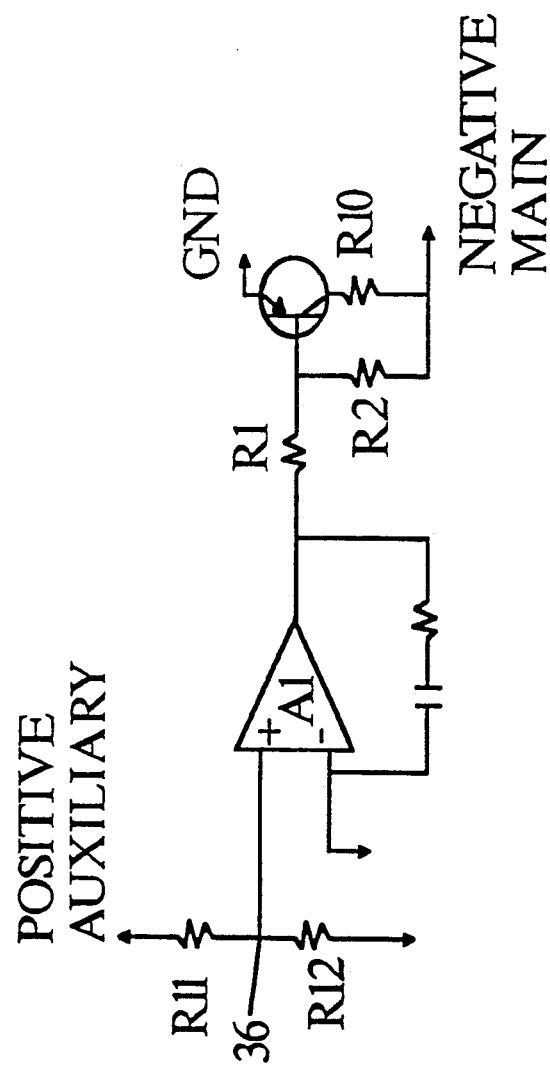
FIG. 2A is an embodiment of the preload circuit in a DC to DC converter having a negative main output and a positive auxiliary output.
Figure 2B:
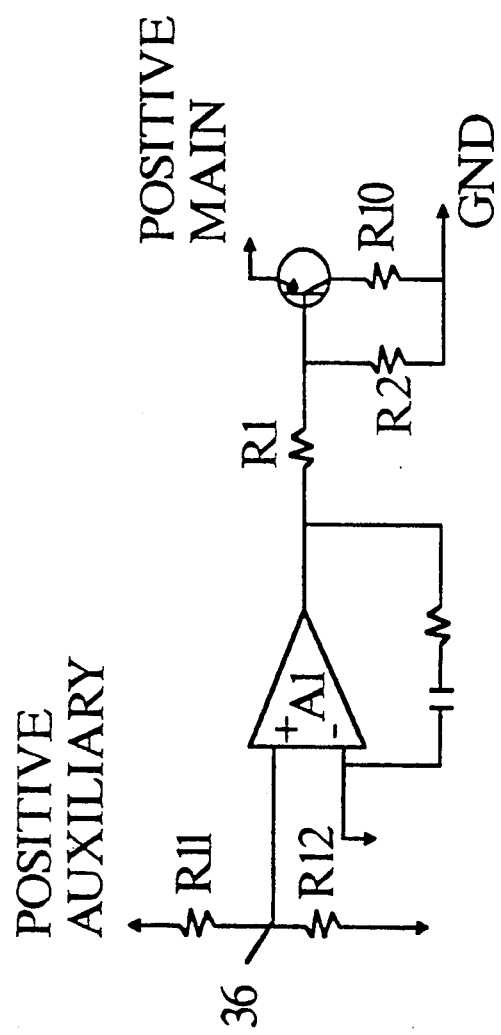
FIG. 2B is an embodiment of the preload circuit in a DC to DC converter having main and auxiliary outputs which are both positive.
Figure 2C:
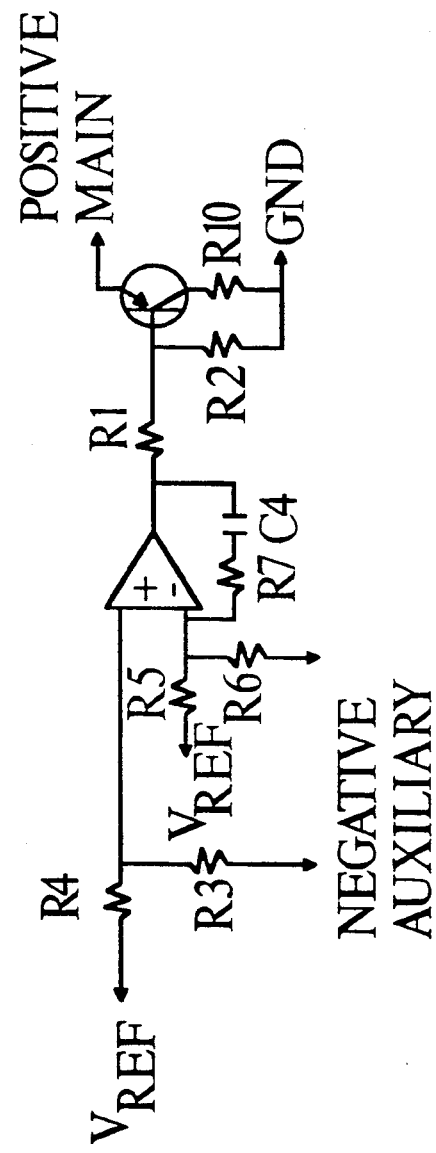
FIG. 2C is an embodiment of the preload circuit in a DC to DC converter having a positive main output and a negative auxiliary output.

Referring now to FIGS. 2A, 2B and 2C there are shown schematic diagrams for embodiments for circuit 12 for the main and auxiliary converter output terminals sharing the same ground and for the following conditions of main and auxiliary converter output polarity:

FIG. 2A main output is negative and auxiliary output is positive;

FIG. 2B main and auxiliary outputs are both positive; and

FIG. 2C main output is positive and auxiliary output is negative.

The overall function of each of the embodiments for circuit 12 shown in FIGS. 2A, 2B and 2C is identical to the overall function of the embodiment for circuit 12 shown in FIG. 1. Most of the circuit components and their connections shown in FIGS. 2A, 2B and 2C are identical in function and connection, respectively, to the circuit components and their connections shown in FIG. 1. Those identical components and connections have the same designations and reference numerals, respectively, as are used in Figure for those components and connections. Those circuit components and their connections shown in FIGS. 2A, 2B and 2C which are not identical to a component and connection shown in FIG. 1 have been given new designations and reference numerals. Only the differences need be described.

As is shown in FIG. 2A, the inverting input of A1 is connected directly to REF. The noninverting input is connected to a junction 36 which in turn is connected by a resistor R11 to the positive auxiliary output and by a resistor R12 to ground (COM). As is shown in FIG. 2B, the inverting input of A1 is connected to REF, and the noninverting input of A1 is connected to the positive auxiliary output and COM in the same manner as was just described for the embodiment of FIG. 2A. For the embodiment of FIG. 2B the emitter of Q1 is connected to the positive main output while the base and collector of the transistor are both connected by resistors R2 and R10 respectively to COM. As is shown in FIG. 2C, the noninverting input is connected to the negative auxiliary output 22a through R3 and to REF through R4. The inverting input of A1 is connected to COM through R6 and to REF through R5. While the emitter, base and collector of Q1 are connected to the positive main output 18a and COM in the same manner as was just described above for the embodiment of FIG. 2B.

Figure 3:
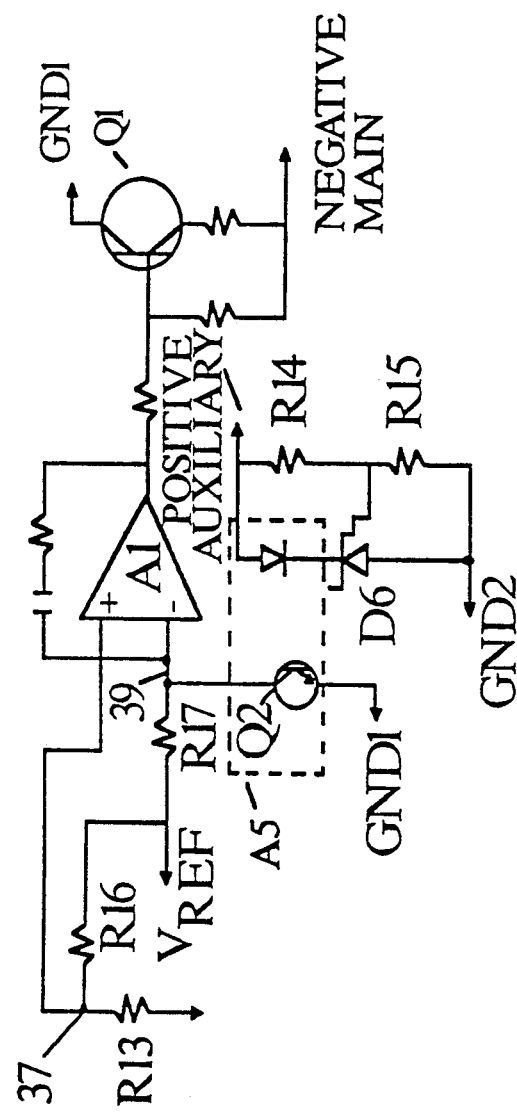
FIG. 3 is an embodiment of the preload circuit in a DC to DC converter similar to that shown in FIG. 2A, with the main and auxiliary outputs having different grounds.

There is shown in FIG. 3 a schematic diagram for an embodiment of circuit 12 when the main and auxiliary converter outputs do not share the same ground. In FIG. 3 the ground associated with the main converter output is designated as GND1, while the ground associated with the auxiliary converter output is designated as GND2. In the embodiment for circuit 12 shown in FIG. 3 the main output is negative with respect to its ground while the auxiliary output is positive with respect to its ground. Therefore, that embodiment for circuit 12 is, except for the connections to the associated one of the two grounds, identical to the embodiment shown in FIG. 2A for circuit 12. Thus in the embodiment of FIG. 3 the voltage controlled preload of the present invention appears between the negative main output of the converter and its associated ground GND1.

Referring now to FIG. 3, it is seen that the emitter of transistor Q1 is connected to GND1 while the base and collector of the transistor are connected by resistors R2 and R10, respectively to the converter's negative main output terminal. Once again the same reference numerals and designations are used in FIG. 3 as are used in FIG. 2a for those components and elements which function in the embodiment of FIG. 3 in the same manner that they function in the embodiment of FIG. 2A.

As is shown in FIG. 3 the junction 37 of the noninverting input terminal of amplifier A1 and resistor R16 is connected by a resistor R13 to the ground GND1 of the main output. As is also shown in FIG. 3 the junction 39 of the inverting input terminal of amplifier A1 and resistor R17 is connected to the collector of a phototransistor Q2. The emitter of Q2 is connected to the main output ground GND1. Phototransistor Q2 in combination with a light emitting diode D5 forms an optocoupler A5. The anode of diode D5 is connected to the auxiliary output of the converter while the anode of a zener diode D6, which functions to provide a reference voltage, is connected to the auxiliary output ground GND2.

The invention has been described with reference to the preferred embodiments. Obviously modifications and alterations will occur to others upon a reading and understanding of this specification. It is intended to include all such modifications and alterations insofar as they come within the scope of the appended claims or the equivalents thereof.

Having thus described the invention, it is now claimed:

1. A converter comprising:
    an input means;
    a power transformer having a primary winding circuit arranged to receive an input from the input means, the primary winding circuit including a primary winding connected to a switching means for switching the input to the primary winding, and a controller means for controlling a duty cycle at which the switching device operates, and the power transformer also having at least two secondary windings respectively arranged in a main output circuit and an auxiliary output circuit for receiving a transformed input from the primary winding;
    a preload circuit including,
        a comparing means arranged with a first input for sensing an output value from the auxiliary output, a second input for sensing a preselected reference value, and an output for outputting a differential output based on the values sensed by the first and second inputs, and
        a preload means operatively connected to appear at the main output, and also arranged to receive the differential output of the comparing device, whereby linear variations in operation of the preload means due to the linearly varying output of the comparing means causes the preload means to appear at the main output as a linearly varying preload; and,
        a feedback circuit associated with an output terminal of the main output circuit and the controller means, for providing a feedback signal to the controller means to adjust the duty cycle of the switching means to compensate for the appearance of the linearly varying preload at the main output.

2. The apparatus of claim 1, wherein the comparing means and preload means are arranged to function in a DC—DC converter whose main output is negative and auxiliary output is positive.

3. The apparatus of claim 1, wherein the comparing means and preload means are arranged to function in a DC—DC converter whose main and auxiliary outputs are both positive.

4. The apparatus of claim 1, wherein the comparing means and preload means are arranged to function in a DC—DC converter whose main output is positive and auxiliary output is negative.

5. The apparatus of claim 1, wherein the comparing means and preload means are arranged to function in a DC—DC converter whose main and auxiliary outputs have different grounds.

6. The converter of claim 1, wherein the auxiliary output circuit further includes a post regulator means for regulating the voltage of the auxiliary output circuit.

7. The converter of claim 1, wherein the comparing means is an operational amplifier.

8. The converter of claim 1, wherein the preload means is a transistor having at least first, second and third terminals connected such that the transistor appears at the main output, and the first terminal also arranged to receive the differential output of the comparing device.

9. In a DC to DC converter having a main and auxiliary outputs an apparatus for linearly preloading the main output in a range from a no-load condition to a full-load condition, the apparatus comprising:
    a comparing means arranged with a first input for sensing an output value from the auxiliary output, a second input for sensing a preselected reference value and an output for outputting a differential output based on the values sensed by the first and second inputs, and
    a preload means operatively connected to appear at the main output, and to receive the differential output of the comparing means, whereby linear variations in operation of the preload means due to the linearly varying output of the comparing means causes the preload means to appear across the main output as a linearly varying preload.

10. The apparatus of claim 9 further including a feedback means connected between a terminal of the main output and a controller means which controls a duty cycle at which a switching device applies a DC input to a primary winding of the DC to DC converter, the feedback means supplying a feedback signal to the controller means to adjust the duty cycle of the switching device to compensate for the appearance of the linearly varying preload at the main output.

11. The apparatus of claim 9, wherein the comparing means is an operational amplifier.

12. The apparatus of claim 9, wherein the comparing means and preload means are arranged to function in a DC to DC converter whose main output is negative and auxiliary output is positive.

13. The apparatus of claim 9, wherein the comparing means and preload means are arranged to function in a DC to DC converter whose main and auxiliary outputs are both positive.

14. The apparatus of claim 9, wherein the comparing means and preload means are arranged to function in a DC to DC converter whose main output is positive and auxiliary output is negative.

15. The apparatus of claim 9, wherein the comparing means and preload means are arranged to function in a DC to DC converter whose main and auxiliary outputs have different grounds.

16. The apparatus of claim 9, wherein the preload means is a transistor having at least first, second and third terminals connected such that the transistor appears at the main output, and the first terminal also arranged to receive the differential output of the comparing device.

17. A method of applying a linearly varying preload at a main output of a converter having a primary winding circuit for receiving an input, and a secondary winding arrangement including a main winding in a main output circuit and an auxiliary winding in an auxiliary output circuit, the method comprising:
    applying the input to input terminals of the primary winding circuit;
    switching with a switching means the input to the primary winding which in turn transfers a transformed input to the secondary winding arrangement;

controlling with a controlling means a duty cycle at which the switching device operates;

supplying the controlling means with a feedback signal from a feedback circuit to determine the duty cycle of switching;

comparing with a comparing means a preselected reference value with an auxiliary output value to produce a linearly varying differential output;

supplying the linearly varying differential output to a preload means connected at the main output such that a gain of the preload means is dependent upon the differential output.

18. The method of claim 17, wherein the preload means linearly increases its preloading as a normal load of the main output decreases, and linearly decreases its preloading as the normal load of the main output increases.

* * * * *